Figure 1:
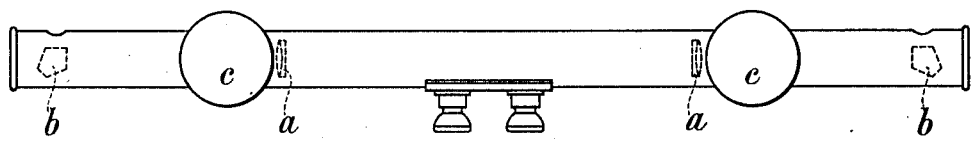

O. EPPENSTEIN.
TELEMETER.
APPLICATION FILED DEC. 14, 1910.

1,022,358.  Patented Apr. 2, 1912.

Witnesses:
Paul Krüger
Richard Hahn

Inventor:
Otto Eppenstein

UNITED STATES PATENT OFFICE.

OTTO EPPENSTEIN, OF JENA, GERMANY, ASSIGNOR TO THE FIRM OF CARL ZEISS, OF JENA, GERMANY.

TELEMETER.

1,022,358.  Specification of Letters Patent.  Patented Apr. 2, 1912.

Application filed December 14, 1910. Serial No. 597,220.

*To all whom it may concern:*

Be it known that I, OTTO EPPENSTEIN, a citizen of the German Empire, residing at Carl-Zeiss strasse, Jena, in the Grand Duchy of Saxe-Weimar, Germany, have invented a new and useful Telemeter, of which the following is a specification.

The invention relates to a telemeter having its ocular system as usual approximately in the middle of the casing, but having the said casing divided, in order to increase its portability, into three parts, in such a manner that the end portions are each connected to the middle portion by means of a hinged, a coupled or a telescopic joint. Such a telemeter is already known from the Patent 739,475 (p. 2, ll. 95 to 103, as also Figures 5 to 6ª). But in the instrument, there proposed, the condition, which must be complied with in practice, viz. that the lens system producing the two images of the object must belong to the same portion of the casing as the ocular system, is only realized by the said lens system being embodied in a single objective lens with the help of a great number of reflecting prisms and by shifting the ocular system considerably out of the middle of the instrument. According to the present invention the said condition can also be complied with in a telemeter, the arrangement of which is the ordinary one, viz. that the ocular system lies between two objective lenses and that the objective reflecting systems are placed before the said lenses. Given that the distance between the two objective lenses is chosen considerably smaller than the distance between the objective reflecting systems, the hinged, coupled or telescopic joint can be arranged between each lens and its reflecting system. If hinges are made use of and the objective reflecting systems are such as have an invariable deflection, *i. e.* such as may be turned in the sighting plane (the plane of triangulation) without the position of the emerging pencil system being thereby altered, it is important to arrange the hinges in such a manner, that the hinge axes shall be perpendicular to the sighting plane, and hence the plane of rotation of each hinge shall coincide with the sighting plane. For during the testing of the present invention it was found, that a permanent warping of the outer end portions appears after frequent and rough folding and unfolding of the instrument generally speaking only in the plane of rotation of the hinge, where, with the position of the joint axes as stated and the assumed property of the objective reflecting systems, they do not act prejudicially. The middle portion, when not sufficiently rigid, may also become warped in the same plane. But this would also not be detrimental, if the well-known arrangement be adopted of fixing the objective lenses and the front part of the ocular system to an inner carrier, which is so mounted in the outer casing as not to take part in any warping of the latter.

Figure 2:
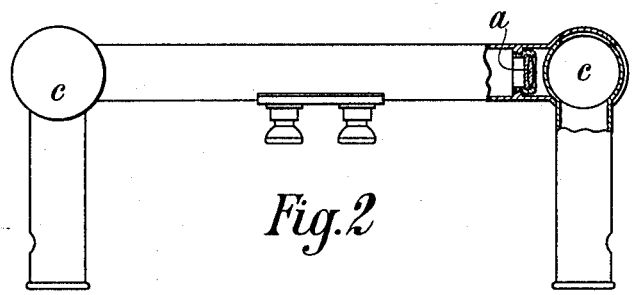
Figure 3:
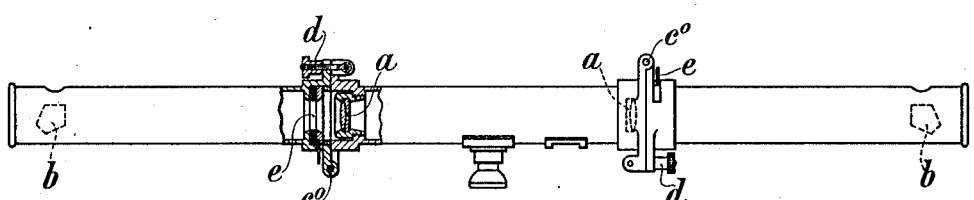
Figure 4:
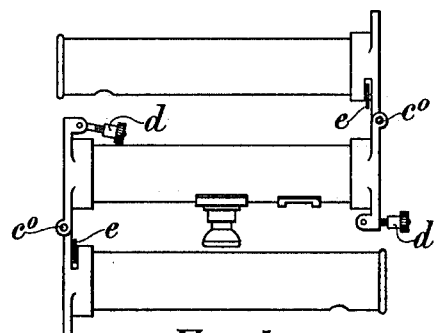

In the annexed drawing: Fig. 1 is a diagram of a stereoscopic telemeter constructed according to the invention unfolded ready for use. Fig. 2 shows the same instrument, partly in section, folded ready for packing. Fig. 3 is a diagram, partly in section, of a separating prism telemeter constructed according to the invention unfolded ready for use. Fig. 4 shows the same instrument folded ready for packing.

In Figs. 1 and 2 the objective lenses $a$ lie in the middle portion of the casing. As objective reflecting systems of invariable deflection pentagonal prisms $b$ are employed. The axes of the hinges $c$ lie perpendicular to the sighting plane. The hinge members (bearings and hollow journals) are formed by the walls of the casing themselves, so that when folding the instrument no openings appear. The instrument, when folded as in Fig. 2, may be placed in a ⌐⌐ shaped case, which would be especially suitable as part of the equipment of a horseman.

In Figs. 3 and 4 the hinges $c^0$ lie on different sides of the casing and are each supplemented by a swing bolt opposite to it. At the inner end of either end portion an iris shutter $e$ is arranged for the purpose of protecting the interior of the end portions from dirt when the hinges are open.

I claim:

1. A telemeter the casing of which is rectilinear in the operative condition of the telemeter and consists of a middle portion and two end portions, each end portion containing an objective reflecting system, which is adapted to transmit the entering axial ray to the middle portion after having deflected it by 90° in the sighting plane, the middle portion containing in its central part the ocular system and at each end an objective lens, the axis of which is perpendicular to the direction of the said entering axial rays, and the three portions being movably connected together so as to allow an inoperative condition of the telemeter, in which the casing has a reduced size.

2. In a telemeter a rectilinear casing consisting of a middle portion and two end portions, which three portions are hinged together with the hinge axes perpendicular to the sighting plane, in each end portion an objective reflecting system having an invariable deflection of 90° in the sighting plane, in the central part of the middle portion an ocular system and at each end of this middle portion an objective lens, the axis of which is perpendicular to the direction in which the axial rays enter the objective reflecting systems.

OTTO EPPENSTEIN.

Witnesses:
PAUL KRÜGER,
RICHARD HAHN.

Copies of this patent may be obtained for five cents each, by addressing the "Commissioner of Patents, Washington, D. C."